June 19, 1956 H. G. TASKER ET AL 2,751,587
RANGE GATED AUTOMATIC GAIN CONTROL
Filed March 3, 1952 2 Sheets-Sheet 2
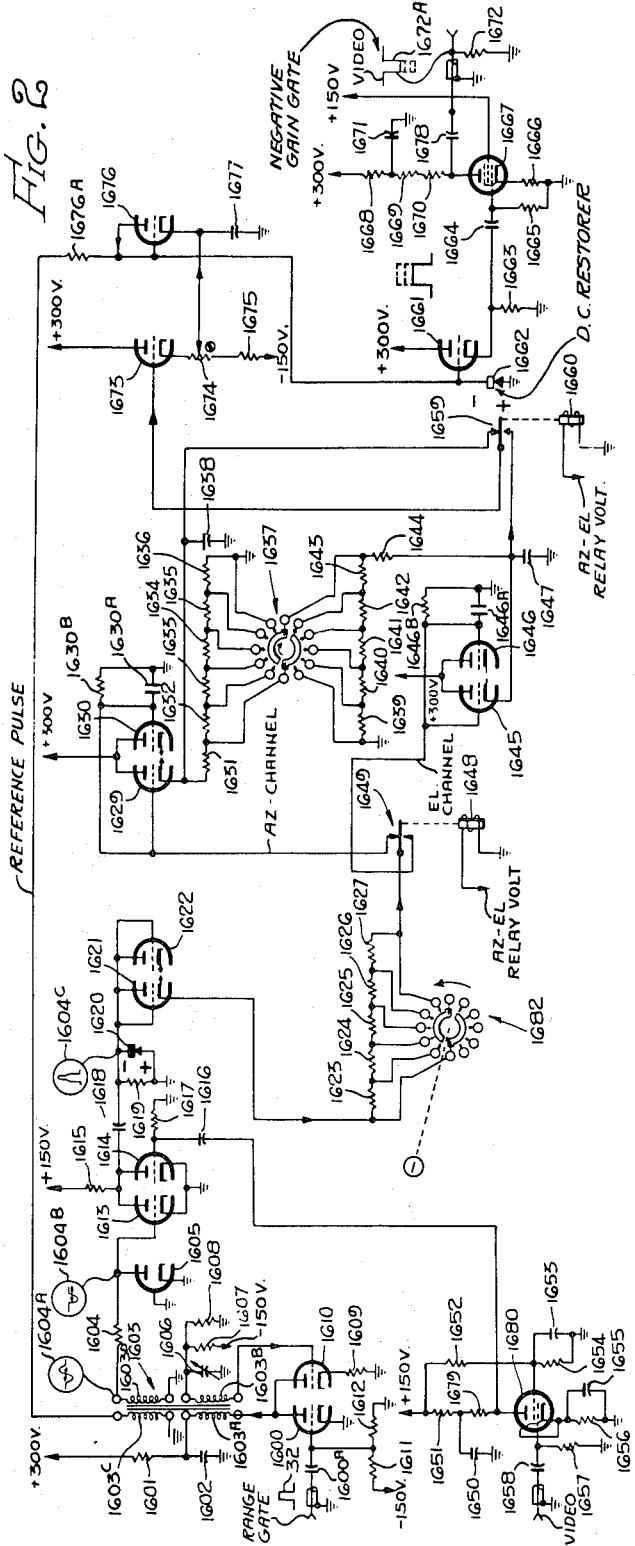
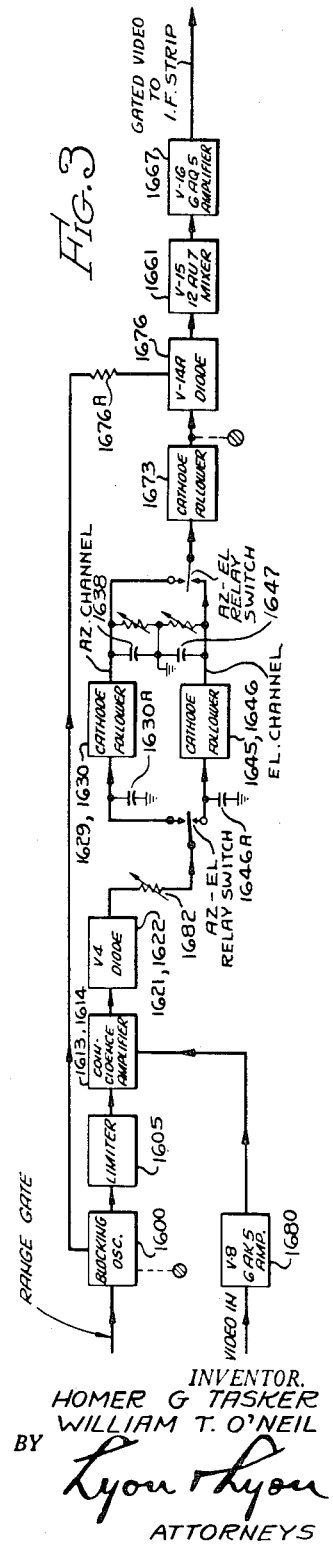
INVENTOR.
HOMER G. TASKER
WILLIAM T. O'NEIL
BY
Lyon & Lyon
ATTORNEYS United States Patent Office 2,751,587
Patented June 19, 1956

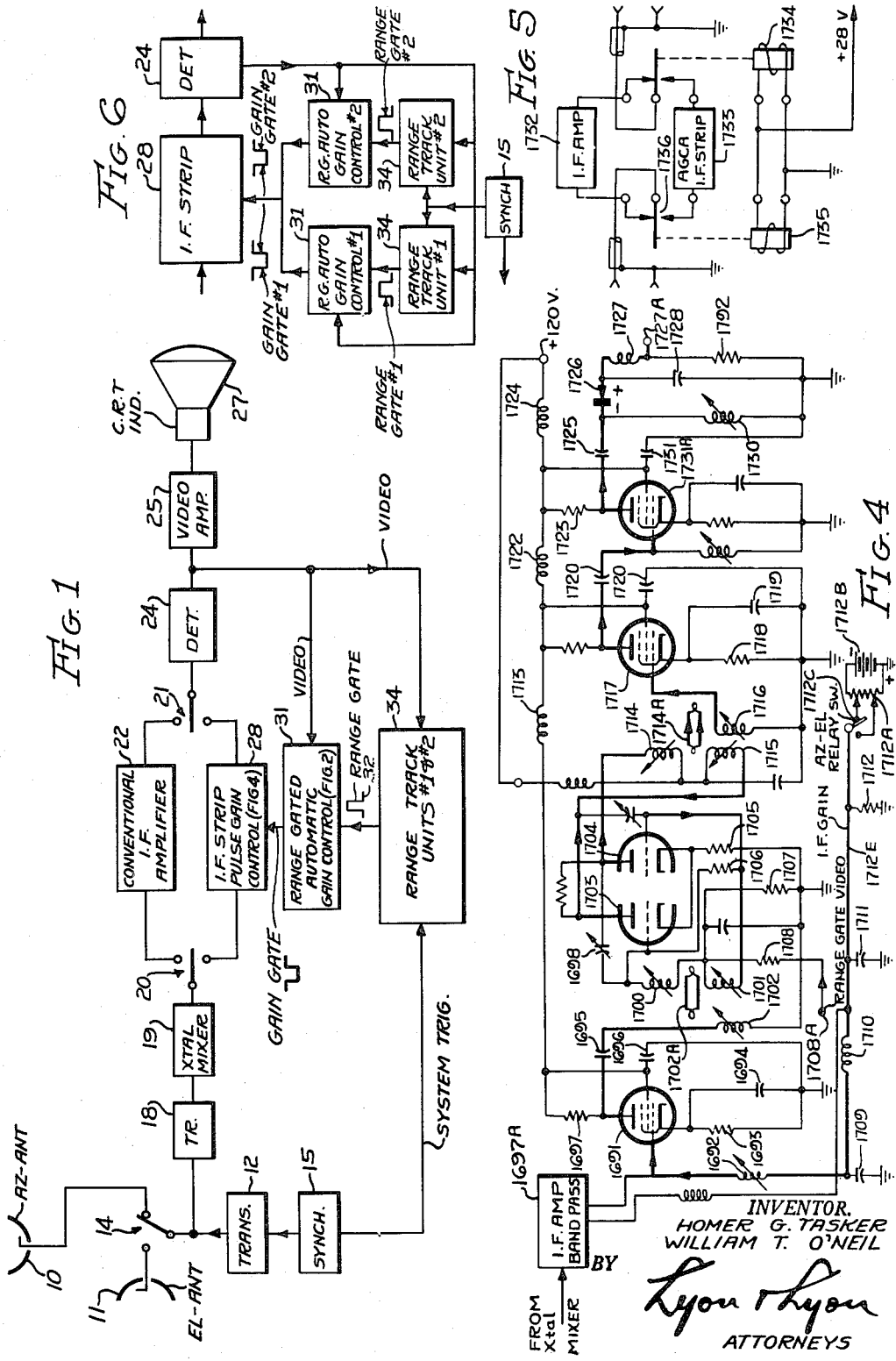

2,751,587

RANGE GATED AUTOMATIC GAIN CONTROL

Homer G. Tasker, Van Nuys, and William T. O'Neil, La Crescenta, Calif., assignors to Gilfillan Bros., Inc., Los Angeles, Calif., a corporation of California Application March 3, 1952, Serial No. 274,610

2 Claims. (Cl. 343—17.1)

The present invention relates to an improved gain control circuit for radar receivers, and, more specifically, to improvements in automatic G. C. A. systems (automatic ground controlled approach aircraft landing systems) wherein it is desired to control the gain of an intermediate frequency amplifier in a superheterodyne receiver in accordance with the amplitude of radar echoes from desired targets only, the arrangement herein functioning generally to measure the amplitude of radar echoes from desired targets to control the gain of the intermediate frequency amplifier in an inverse relationship.

The present invention contemplates improved gain control circuitry which is rendered sensitive to echoes from desired targets only, and, for that general purpose, the video developed in the output of the receiver is "range gated" by a control voltage or range gate developed in automatically tracking the desired target before being applied to a gain control stage, i. e., the intermediate frequency amplifying stage of the radar receiver. Further, this circuitry has "memory" and adjustable "learning" and is thus particularly advantageous in A. G. C. A. systems wherein echoes from a corresponding plurality of aircraft in the aircraft approach zone to a landing field are received in periodic scanning of the azimuth and elevation antenna beams.

It is therefore an object of the present invention to provide improved means and techniques for accomplishing the results indicated above.

A specific object of the present invention is to provide an improved automatic gain control circuit which serves to measure the amplitude of radir echoes and to control the gain of the radar receiver in an inverse relationship.

Another specific object of the present invention is to provide an improved gain control circuit in which a control signal developed in accordance with the amplitude of the radar echoes for controlling the gain of the radar receiver is applied at the time radar echoes are being expected from desired targets.

Another specific object of the present invention is to provide an improved gain control circuit which serves to develop a control voltage for controlling the gain of a receiver, such control voltage being developed only as a result of echoes from desired targets so that echoes from undesired targets, such as clutter areas through which the antenna beam scans, have substantially no effect on the gain of the receiver.

Another specific object of the present invention is to provide an automatic gain control circuit for a single radar receiver which serves to develop substantially simultaneously data regarding a plurality of aircraft in an approach zone to an aircraft landing field as a related antenna beam scans through such approach zone, the gain of such radar receiver being controlled cyclically in a degree dependent upon the particular echo which is received at that particular instant, so that relatively large echo signals, in general, have larger control effects than smaller echo signals.

Another specific object of the present invention is to provide a gain control system of the character described in the preceding paragraph in which adjustable memory means are provided and in which means are provided for adjusting the time during which such memory means may learn or acquire information of the received echoes.

Another specific object of the present invention is to provide an improved gain control system in which a gating voltage, i. e., a range gate, is produced representative of the range of an aircraft from which echo signals are being derived in the form of video, and in which such range gate is amplitude modulated in accordance with the intensity of such echo signals, before being applied to a gain control element of the radar receiver.

Another specific object of the present invention is to provide improved circuitry which serves to measure the amplitude of radar echoes and to control the gain of the radar receiver in an inverse relationship, the circuitry including adjustable "memory" and "learning" characteristics whereby the gain control is partially dependent upon "remembered" input, and whereby the rate of response to new input amplitudes may be adjusted.

Another specific object of the present invention is to provide a range gated automatic gain control for a single radar receiver operating in conjunction with azimuth and elevation antenna scanning, on a time sharing basis, in a horizotal and vertical plane so that the gain level established by an integrated value of radir hits on objects in the scanned area has a time constant of variation of the order of 5 to 10 scan periods, such that the variation of receiver output is maintained relatively uniform at least within 6 decibels when a test signal is varied over a range of 40 decibels, with the minimum signal being a typical radar echo from a range of 5 miles.

Another specific object of the present invention is to provide an improved gain control system in which the gain of a single radar receiver may be controlled in accordance with video signals developed from a plurality of objects such as aircraft which are simultaneously being tracked in range.

Another specific object of the present invention is to provide an improved gain control system in which the gain of a radar receiver may be controlled in accordance with substantially only the intensity of a desired video signal even though the radar receiver serves to develop video signals of much larger intensity as a result of reflections from clutter areas.

Another specific object of the present invention is to provide an improved gain control system in which a video signal and a corresponding range gate from an object tracked in range are combined in such a manner that the gain of a radar receiver is controlled for the duration of such range gate in an amount dependent upon the amplitude of such video signal.

Another specific object of the present invention is to provide an improved gain control system in which a desired video signal and a corresponding range gate from an object tracked in range are combined in such a manner that the range gate serves essentially two functions, i. e. (1) the range gate serves as a pedestal for the video signal so that such video signal, by a peak detection process, is distinguished over other video signals even though they are of larger amplitude than such desired video signals and (2) the range gate is amplitude modulated in accordance with the amplitude of the desired video signal and then applied as a gain gate to control the gain of a radar receiver for the duration of such range gate.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows an improved range gated gain control circuit embodying features of the present invention.

Figures 2 and 3 show, respectively, in schematic and block diagram form, the circuitry indicated in Figure 1 as range gated automatic gain control.

Figure 4 is a schematic representation of a portion of the radar receiver indicated as "I. F. strip pulse gain control" in Figure 1.

Figure 5 serves to illustrate the manner in which the receiving system shown in Figure 1 may be converted from conventional operation to an operation in accordance with the features of the present invention.

Figure 6 illustrates the manner in which a single radar receiver, in an AGCA system, is controlled in gain in accordance with the range gates and video signals developed in a plurality of control channels.

The radar system shown in Figure 1 serves to illustrate generally certain components of an automatic ground controlled approach (A. G. C. A.) system. Figure 1 shows the conventional azimuth antenna 10 and elevation antenna 11, which, on a time sharing basis, scan the approach zone to an aircraft landing field for purposes of transmitting pulsed energy and receiving resultant echoes from aircraft in such approach zone. For that purpose, pulsed energy from the transmitter 12 is transferred through the radar frequency Az-El switch 14 to either antenna 10 or antenna 11, as the case may be. For purposes of initiating energy pulses in timed relationship, synchronizing pulses are transferred to the transmitter 12 from the synchronizer stage 15.

The resulting echoes received on the azimuth antenna 10 or elevation antenna 11, as the case may be at any one partciular time, are transferred through the conventional tune-receive (TR) switch 18 to the crystal mixer stage 19 of a superheterodyne type of radar receiver, such crystal mixer serving to transform the received echo signals to a predetermined intermediate frequency, as is well understood in the art. Such signals of intermediate frequency are in conventional manner (with the movable contacts of switches 20, 21 engaging the upper contacts) amplified in the conventional intermediate frequency amplifier stage 22, and applied to the detector stage 24. The resulting video is amplified in the video amplifier 25 and applied to an intensity control electrode of the cathode ray tube or indicator tube 27.

In accordance with the present invention (with the movable contacts of switches 20, 21 engaging the lower stationary contacts), a control signal developed from range gated video is applied to certain stages of the intermediate frequency amplifier 28 through which, of course, at this time signals are being transferred from the crystal mixer 19 to the detector stage 24. For this purpose, the video developed in the detector 24 is transferred to the range gated automatic gain control stage 31 wherein such video is combined with a range gate 32 developed in the range tracking unit 34, i. e., the range gate 32 serves as a pedestal for the video to distinguish such video from other signals which possibly have larger amplitudes than such video. In general, the control signal in the form of a gain gate applied to the IF amplifier stage 28 is such that its gain is varied in an inverse relationship to the amplitude of the video developed at the output of the detector stage 24 so that the output signal is substantially constant and all radar echoes are indicated with substantially constant intensity on the face of the cathode ray tube 27.

The range gate 32 is developed in the range tracking unit 34, details of which are described and claimed in the copending application of Alvin Guy Van Alstyne, Serial No. 244,111, filed August 29, 1951, and assigned to the same assignee, such copending application relating to means and techniques whereby an aircraft in the approach zone may be "acquired" by a range tracking circuit incorporating a servo loop, such servo loop, after aircraft acquisition, serving to track the flight of an aircraft with respect to range and as a result of such tracking to develop the range gate 32. This range gate 32 is a gating voltage which is delayed with respect to the system trigger developed in the synchronizing unit 15, the delay being truly a measure of the distance or range of the aircraft from the ground based radar equipment. For purposes of developing the range gate 32, there is applied to the range tracking unit 34 video from the detector stage 24 and a system trigger from the synchronizing unit 15.

The manner in which the video applied to the stage 31 is combined with the range gate 32 is now described in greater detail with respect to Figures 2 and 3, Figure 3 being a block diagram of the arrangement illustrated in Figure 2.

Video developed at the output of the detector stage 24 (Figure 1) is applied through the coupling condenser 1658 to the control grid of the pentode amplifier tube 1680 which has its cathode connected to ground through the conventional resistance-condenser biasing arrangement 1656, 1655. The control grid of tube 1680 is connected to ground through the resistance 1657. The screen grid of tube 1680 is connected to the junction point of resistances 1652 and 1654 which provide a voltage dividing circuit, one terminal of resistance 1652 being connected to a +150 volt source and one terminal of resistance 1654 being grounded. The bypass condenser 1653 shunts resistance 1654. The anode of amplifying tube 1680 is connected to the +150 volt source through the serially connected resistances 1679 and 1651, the junction point of which is bypassed to ground through bypass condenser 1650.

The amplified video voltage thus appearing on the anode of tube 1680 is transferred through coupling condenser 1616 to the control grid of the coincidence amplifying tube 1614 which has its control grid returned to ground through resistance 1617. The cathodes of tubes 1613, 1614 are both grounded and the anodes of tubes 1613, 1614 are each connected to a +150 volt source through resistance 1615. The video signal thus developed on the anode of tube 1614, of positive value, is mixed with a voltage developed by the positive range gate 32 applied through condenser 1600A to the control grid of the blocking oscillator stage 1600, 1610. The tube 1600, in its quiescent state, is normally nonconducting, since its control grid is maintained at a relatively large negative potential, being connected to the junction point of resistances 1611, 1612, which form a voltage dividing network connected between a —150 volt source and ground. The cathode of tube 1600 is grounded. The anodes of tubes 1600, 1610 are both connected through the transformer winding 1603A and resistance 1601 to a +300 volt source, the junction point of winding 1603A and resistance 1601 being bypassed to ground through condenser 1602. The cathode of tube 1610 is returned to ground through resistance 1609; and the control grid of tube 1610 is connected to a —150 volt source through serially connected transformer winding 1603B and resistance 1607. In order to provide some control over the width of the pulse developed in the blocking oscillator stage, an adjustable condenser 1606 has one of its terminals grounded and the other one of its terminals connected to the junction point of winding 1603B and resistance 1607. The condenser 1606 is shunted by resistance 1608.

The blocking oscillator stage 1600, 1610 serves to develop voltages in the secondary winding 1603C and 1603D which are applied, on the one hand, as a reference pulse, for purposes described later, to the control grid of the mixer tube 1661, and on the other hand, to the control grid of tube 1613 to achieve a coincident condition. For that purpose, transformer winding 1603C has one of its terminals grounded and the other one of its terminals connected through resistance 1676A to the anode and control grid of tube 1676 and to the control grid of tube 1661, such control grid being returned to ground through the crystal rectifier 1662. Transformer 1603D has one of its terminals grounded and the other one of its terminals connected through resistance 1604 to the control grid of tube 1613 and also to the anode of the clipper, limiter or clamping tube 1605 which has its cathode grounded. By these means, a bipolar voltage represented at 1604A is developed at the junction point of winding 1603D and resistance 1604; but, the positive portion of such voltage 1604A is substantially removed by the limiter tube 1605, as indicated at 1604B. The negative pulse thus transferred to the control grid of tube 1613 causes a positive pulse to appear at the anode of tube 1613 which is mixed at such anode with the video pulse to achieve a wave form at the anodes 1613, 1614 of the character illustrated at 1604C. This composite wave form 1604C is transferred through coupling condenser 1618 to the peak detector stage comprising tubes 1621, 1622 connected in parallel with their control grids connected directly to their anodes. The parallel connected resistance 1619 and crystal rectifier 1620 are connected between ground and the anodes of tubes 1621, 1622.

It is noted that the blocking oscillator stage 1600, 1610 serves to generate a gate corresponding in time to one of the respective range gates and that the gates so generated have high rates of rise and decline. Some adjustment of pulse duration approximating plus or minus 40% is effected by variable capacitive loading of blocking oscillators provided by the adjustable condenser 1606. The coincident circuit consisting of the two triodes 1613, 1614, having a common plate load in the form of resistance 1615, serves as a video "emphasizer" during the duration of the range gate. Subsequent peak detection effected by the tubes 1621, 1622 affords a method of determining combined gate and video maximum amplitude, it being observed that the gate component is constant and therefore compensable through a compensation process described later. The output of the diode connected tubes 1621, 1622 is applied through a variable step series resistance 1623, 1624, 1625, 1626 and 1627 to the movable contact of the single-pole double-throw Az-El relay switch 1649, where azimuth and elevation functions are selected and applied, on a time sharing basis, to the azimuth channel and elevation channel, i. e., to the control grid of tube 1629 and the control grid of tube 1645. The capacitor 1630A, in the azimuth function, and the capacitor 1646A, in the elevation function, respectively are charged through the resistance steps determined by the setting of the multiposition switch 1682. These capacitors 1630A and 1646A provide integrated input voltages with variable "learning" characteristics to the cathode follower tubes 1629, 1630 on the one hand and 1645, 1646 on the other hand. As indicated previously, the "learning time" for these capacitors is varied through suitable ranges by adjustment of the "learning time" switch 1682.

The condenser 1630A is connected in shunt with resistance 1630B, whereas similarly resistance 1646B is in parallel with condenser 1646A. For the purpose at hand, resistances 1623, 1624, 1625, 1626 and 1627 are respectively 2200 ohms, 1000 ohms, 470 ohms, 220 ohms and 100 ohms. Condensers 1630A and 1646A are each 3300 microfarads and resistances 1630B and 1646B are each 4.7 megohms.

The output of the azimuth cathode follower 1629, 1630 is applied to the condenser 1638, while similarly the output of the elevation cathode follower 1645, 1646 is applied to the condenser 1647. The decay time of the charge in condensers 1638, 1647 is determined by the parallel resistance steps determined by the position of the multiswitch 1637. The azimuth and elevation functions are then combined by the Az-El relay switch 1649 and applied to the control grid of the cathode follower tube 1673.

For the above mentioned purposes, the azimuth decay time determining resistances 1631, 1632, 1633, 1634, 1635 and 1636 are respectively 1000 ohms, 4.7 megohms, 3.3 megohms, 3.3 megohms, 1.5 megohms and 1.5 megohms; whereas, the elevation decay time determining resistances 1639, 1640, 1641, 1642 and 1643 and 1644 are respectively 1.5 megohms, 1.5 megohms, 3.3 megohms, 3.3 megohms, 4.7 megohms, and 1000 ohms, and condensers 1638 and 1647 are each 2 microfarad condensers.

The cathode follower 1673 has its anode connected to a +300 volt source and its cathode connected to a −150 volt source through serially connected resistances 1674, 1675. The resistance 1674 constitutes a so-called level adjusting resistor and for that purpose has its adjustable tap connected to the cathode of the diode 1676 to accomplish a mixing function in stage 1661. The control grid and anode of the diode connected tube 1676 are both connected through the afore-mentioned resistance 1676A to the ungrounded terminal of winding 1603C; while the cathode of tube 1676 is connected to ground through condenser 1677. Also, the control grid and anode of tube 1676 are both connected to the control grid of the cathode follower tube 1661, such control grid being returned to ground through the crystal rectifier 1662; and the cathode of tube 1661 is returned to ground through the load resistance 1663. The signal at the anode of tube 1676, it is noted, is the negative-going portion of the original bipolar pulse 1604A occurring at essentialy the same time as the combined positive surge and video pulse illustrated at 1604C. Combination of the two signals thus affords a measurement of the video level, with the pulses generated in the blocking oscillator stage 1600, 1610 serving as a reference and being modulated in intensity in accordance with the intensity of the video signal. The result is that a signal of positive polarity is developed on the cathode of tube 1661, having a duration equal to the range gate but modulated in amplitude. The signal of positive polarity thus developed across the load resistance 1663 is applied through coupling condenser 1664 to the control grid of the pentode amplifying tube 1167 which has its control grid and cathode returned to ground through resistances 1665, 1666 respectively.

The anode of tube 1667 is connected through serially connected resistances 1168, 1669 and 1670 to a +300 volt source with the junction point of resistances 1668, 1669 being bypassed to ground through condenser 1671. The screen grid of tube 1667 is connected to a +150 volt source. The amplified signal, of inverted negative polarity developed on the anode of tube 1667, is applied through coupling condenser 1678 to the resistance 1672, the gate appearing across resistance 1672 appearing at 1672A. This gate consisting of negative-going pulses, of variable amplitude, bears an absolute relationship to the amplitude of the video target pulses which are measured. These negative-going pulses, which constitute a gain gate, are applied to the intermediate frequency amplifier stage 28, as indicated in Figure 1 and shown in detail in Figure 4, the gate being applied to terminal 1708A in Figure 4 to effect modulation of the gain of the intermediate frequency amplifier.

It is noted, from the above description, that the condensers 1638 and 1647 impart "memory" to the azimuth and elevation functions respectively, since these condensers "remember" the amplitude information derived from the previous scans. The learning and memory features of this circuitry are considered novel. It is observed, following the peak detector stages 1621, 1622, that the charging capacitors 1630A, 1646A have adjustable "leaning" time as a result of the adjustable switch 1682. However, the time constant may not, as a practical matter, be made long enough without unreasonably large values of resistance for adequate scan-to-scan memory; and yet provide sufficient rapid learning time without requiring unreasonably large charging currents. The first charging circuit involving condensers 1630A and 1646A is therefore maintained to regulate learning time and does not have long-time holding characteristics. The required long-time holding characteristics are achieved by circuitry involving the condensers 1638, 1647 which comprise the cathode impedance of different cathode followers. The latter circuit is referred to as the "memory follower," and is able, by virute of the characteristics of the cathode follower, to charge the relatively large memory condensers 1638, 1647 in close duplication of the peak detector's own charging circuit. These cathode follower circuits, on the one hand 1629, 1630 and on the other hand 1640, 1646, are independent of the decline of the peak detector capacitor voltage 1630 and 1646A respectively. The decay time constant resistance is therefore a factor in determining the scan-to-scan memory.

Referring to Figure 4, the gain gate, as mentioned previously, is applied to terminal 1708A to modulate the gain of the intermediate frequency amplifier.

The gain of the intermediate frequency amplifier stage may be manually adjusted in the Az-El functions by positioning the two taps on the voltage dividing resistance 1712A which has its opposite terminals connected to opposite terminals of source 1712B which has its positive terminal grounded. The voltage on either one of these taps is transferred through the movable contact of the single-pole double-throw relay switch 1712C to the lead 1712E. The negative potential on this lead 1712E, in general, establishes the "static level" of amplification in the intermediate frequency amplifier since such negative voltage is applied to the control grid of variable mu tubes. The parallel connected resistance 1712 and condenser 1711 are connected between ground and the lead 1712E.

The received signals from the crystal mixer stage of the superheterodyne receiver are applied to the input of a stagger-tuned band pass amplifier stage 1697A, the output circuit of which is coupled to the control grid of tube 1691. The control grid of tube 1691 is connected through the tunable coil 1692 and coil 1710 to the negative lead 1712E, the junction point of coils 1692 and 1710 being bypassed to ground through condenser 1709. The cathode of tube 1691 is returned to ground through the conventional biasing resistance-condenser combination 1693, 1694. The screen grid of tube 1691 is connected through suitable choke coils 1713, 1722 and 1724 to a +120 volt source. The anode of tube 1691 is connected through resistance 1697 to the same source through the afore-mentioned coils 1714, 1722 and 1724. The amplified voltage thus appearing on the anode of tube 1691 is applied through condenser 1695 to the resonant coil 1702 which has one of its terminals grounded. The resonant coil 1702 is link-coupled through suitable link coupling 1702A to the input of the push-pull amplifying stage 1703, 1704 having the input coils 1700, 1701. The stage 1703, 1704 constitutes a pulse modulator, the push-pull output of which is modulated by the application of the negative-going pulses to the aforementioned terminal 1708A developed in the circuitry illustrated in Figure 2, and applied as a biasing voltage to the control grids of both tubes 1703 and 1704.

Following amplification by the balanced stage 1703, 1704, the IF output is link-coupled by link coupling means 1714A to another stagger-tuned band pass amplifier stage which includes tubes 1717 and 1731 A. The amplified video modulated by the range gated video appearing on the anode of tube 1731A is applied through coupling condenser 1725 to the crystal detector 1726 and the detected video appears on the output terminal 1727A.

The detected video appearing on such terminal 1727A is applied as shown in Figure 1, to the stage 31 and range tracking unit 34. It is thus seen that a closed loop is provided for controlling the gain of the IF strip 28.

It is noted, as indicated above, that the time constant of the circuit, including one or more of the resistances 1623, 1624, 1625, 1626, and 1627, is commensurate with the duration of the range gate, whereas, the time constant of the circuit associated on the one hand with condenser 1638, and on the other hand, the condenser 1647, is commensurate with the scanning time of the azimuth and elevation antenna beams, it being noted that the azimuth antenna scanning period is ¼ of a second and likewise the elevation antenna beam scanning time is ¼ of one second.

In the operation of the circuitry described above, it is observed that the range gate serves two essential purposes, i. e., it serves: (1) to select the particular piece of video with which the apparatus is concerned, and (2) it is used in a modulation process to control the gain of the amplifier for a period beginning immediately before the desired video and ending after the desired video.

The first of these functions, i. e., the selection function, is accomplished by combining the video and range gate as illustrated at 1604C so that the important video is placed on a pedestal and then peak detected. By thus placing the important video on a pedestal, the desired video is distinguished from other undesired video signals which, in fact, may have larger amplitudes than the desired video. Especially, when the radar beam scans through a clutter area.

In such case, without the range gate serving as a pedestal, the amplitude of the undesired large video signals would control the value of voltages developed on the condensers 1630A and 1646A.

To assure against such undesired result, the desired video signal is placed on a pedestal, i. e., on the range gate which is of sufficiently large amplitude to cause the combined amplitudes of the range gate and the desired video to be much greater than the amplitude of undesired video. To aid in the selection process and general exclusion of the effects of random noise effects, the learning "time" of the condensers 1630A and 1646A, determined by the position of the switch 1682, is commensurate with the duration of the range gate.

The second function of the range gate, as indicated above, is for purposes of developing a gain gate indicated as such in Figure 2. The gain gate may be considered to be an amplitude modulated range gate, such range gate being modulated in amplitude depending upon the value of voltage developed on the condensers 1638 and 1647 as the case may be.

It is noted that these condensers 1638 and 1647 are associated with circuitry of relatively large time constant, so that the voltages developed on these condensers vary inappreciably during three or four antenna beam scanning periods.

Figure 5 illustrates a relay switching arrangement whereby either the conventional IF amplifier 1732, or the AGCA IF strip 1733, identical with the strip 28 in Figure 1, may be substituted by the application of 28 volts to the parallel connected relay coils 1735, 1734.

While the system as described above pertains to the control of a radar receiver by a video signal and a range gate developed due to reflections from a single aircraft in an approach zone to an aircraft landing field, Figure 6 illustrates the manner in which the same single radar receiver is controlled by a plurality of video signals and corresponding range gates, developed from reflections from a plurality of aircraft in such approach zone, it being remembered, that the beams from the azimuth and elevation antennas, 10, 11, respectively, scan through such approach zone on a time sharing basis, that the period of azimuth and elevation scan each being in the order of ¼ of one second.

For this purpose, as illustrated in Figure 6, a plurality of range tracking units are provided, there being one range tracking unit per control channel and each of such range tracking units develops a corresponding range gate. Also, there is provided a plurality of range gated automatic gain control channels 31, each of which have supplied thereto a range gate from a corresponding range tracking unit 34.

Each stage 31 and each stage 34 is supplied with video signals developed at the output of the detector stage 34. The output of the range gated automatic gain control stages 31 each comprise a gain gate, and all of the gain gates developed in the plurality of units 31, are applied to a common IF strip 28 in the manner illustrated in connection with Figure 4.

While Figure 6 illustrates the units 31 duplicated, it is observed, that in practice, the input video amplifier 1680 and the mixer stage 1661 and amplifier stage 1667, are common to all of such units to minimize the number of circuit components.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, means deriving video echo signals from a plurality of objects, said means including means for producing an electromagnetic beam and periodically scanning the same through space to derive a corresponding video echo signal from each of said plurality of objects in the space scanned, means deriving a plurality of range gates, each of which is delayed in time, in an amount representative of the range of the corresponding object, amplifying means for amplifying said video signals, said amplifying means being disposed in a single video signal channel between a preceding and a succeeding stage in said channel to amplify each video echo signal, said amplifying means including gain control means, means sensitive to the coincidence of a particular one of said video signals with a corresponding range gate for developing a pulse for controlling said gain control means, said amplifying means comprising a balanced pulse modulator stage for amplifying said echo signals, and means applying said pulse to said balanced modulator stage, said balanced pulse modulator stage being link coupled, on the one hand, to said preceding stage, and on the other hand, to said succeeding stage to modulate the intensity of each of said echo video signals passing through said channel.

2. In a system of the character described, means deriving video echo signals from a plurality of objects, said means including means for developing an electromagnetic beam and for periodically scanning the same through space at a relative slow rate to derive a corresponding video signal from each of the objects in the space scanned, means deriving a plurality of range gates, each of which is delayed in time, in an amount representative of the range of the corresponding object, a single video channel including video signal amplifying means and associated gain control means, coincidence means coupled to said channel and said plurality of range gate deriving means for developing a corresponding control pulse which is the sum of a corresponding video signal and a corresponding range gate, a first storage circuit having variable learing times coupled to the output of said coincidence means and receptive to said control pulses, said storage means having a time constant commensurate with the duration of said range gate, a second storage circuit coupled to said first storage circuit and having a time constant commensurate with said relatively slow rate at which said beam is scanned for developing a voltage which is representative of the integrated values of the echo signals during one scan period, means combining said voltage with each of said range gates to provide a plurality of pulses, means coupling said second storage circuit to said gain control means to apply the last-mentioned pulses to said gain control means to control the degree of amplification in said channel recurrently for each received echo signal.

References Cited in the file of this patent
UNITED STATES PATENTS

| | | |
|---|---|---|
| 2,449,985 | Gloess | Sept. 28, 1948 |
| 2,534,862 | Fox | Dec. 19, 1950 |
| 2,542,032 | Isbister | Feb. 20, 1951 |
| 2,562,309 | Frederick | July 31, 1951 |